United States Patent
Jafa et al.

(10) Patent No.: US 11,282,326 B2
(45) Date of Patent: Mar. 22, 2022

(54) TABLE VENDING MACHINE

(71) Applicant: PepsiCo, Inc., Purchase, NY (US)

(72) Inventors: Emad Jafa, Brewster, NY (US); Xuejun Li, White Plains, NY (US); Yong Serock, Newtown, CT (US); Cheuk Chi Lau, White Plains, NY (US); Martyn Thomas Mitchell, Royston (GB); Euan Morrison, Cambridge (GB); Wai Ting Chan, Cambridge (GB); Samuel Luke Johnstone, Cambridge (GB); Erik David Williams, Cambridge (GB)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 16/179,532

(22) Filed: Nov. 2, 2018

(65) Prior Publication Data
US 2020/0143622 A1    May 7, 2020

(51) Int. Cl.
*G07F 11/42* (2006.01)
(52) U.S. Cl.
CPC ...... *G07F 11/42* (2013.01); *G05B 2219/2645* (2013.01)
(58) Field of Classification Search
CPC .......... G07F 11/16; G07F 11/24; G07F 11/42; G07F 11/165; G05B 2219/2645
See application file for complete search history.

(56) References Cited

U.S. PATENT DOCUMENTS

| | | | | |
|---|---|---|---|---|
| 3,028,045 A | * | 4/1962 | Smith | G07F 11/42 221/10 |
| 3,351,172 A | * | 11/1967 | Hatanaka | G07F 11/16 194/247 |
| 3,874,491 A | * | 4/1975 | Faure | B65G 13/10 193/35 MD |
| 3,921,789 A | * | 11/1975 | Goldinger | B65G 47/54 198/369.6 |
| 4,962,491 A | * | 10/1990 | Schaeffer | A61J 7/0481 221/15 |
| 5,125,782 A | * | 6/1992 | Goldschmidt | B65G 1/06 198/347.1 |

(Continued)

OTHER PUBLICATIONS

Notification of Transmittal of the International Search Report and the Written Opinion of the International Searching Authority, or the Declaration issued in International Application No. PCT/US2019/057627, dated Jan. 9, 2020, 14 pages.

*Primary Examiner* — Gene O Crawford
*Assistant Examiner* — Kelvin L Randall, Jr.
(74) *Attorney, Agent, or Firm* — Sterne, Kessler, Goldstein & Fox P.L.L.C.

(57) ABSTRACT

A vending machine with a reduced vertical height and footprint has a horizontal roller surface system for delivering vending products. The horizontal roller system includes actuated rollers and trays that move on top of the rollers. The products are present on top of the trays; the rollers actuate to deliver the trays, and the products, to a delivery portal. Some embodiments of the vending machine have a transparent top to allow the interior of the vending machine, and particularly the roller surface, to be visible from the exterior of the vending machine. The reduced height and size of the vending machine enables it to be placed in locations that are unavailable to conventional vending machines.

11 Claims, 6 Drawing Sheets

(56) References Cited

U.S. PATENT DOCUMENTS

| | | | | |
|---|---|---|---|---|
| 5,273,183 | A * | 12/1993 | Tuttobene | ............... G07F 7/069 |
| | | | | 221/121 |
| 6,634,940 | B2 * | 10/2003 | Yoshida | ................... A63F 9/30 |
| | | | | 221/210 |
| 6,830,161 | B2 * | 12/2004 | Yuyama | ................. B65B 21/12 |
| | | | | 221/210 |
| 8,082,061 | B2 | 12/2011 | Segal et al. | |
| 8,417,376 | B1 | 4/2013 | Smolen | |
| 9,229,557 | B2 | 1/2016 | Segal et al. | |
| 2003/0089729 | A1 * | 5/2003 | Franci | ..................... G07F 11/16 |
| | | | | 221/208 |
| 2003/0146235 | A1 * | 8/2003 | Peeler, Jr. | ............... G07F 11/32 |
| | | | | 221/123 |
| 2006/0229953 | A1 | 10/2006 | Walker et al. | |
| 2008/0245438 | A1 * | 10/2008 | Ladson | ..................... B65B 1/40 |
| | | | | 141/82 |
| 2010/0072221 | A1 * | 3/2010 | Chirnomas | ............. G07F 11/42 |
| | | | | 221/211 |
| 2010/0300041 | A1 * | 12/2010 | Kim | ................... G07F 17/0092 |
| | | | | 53/281 |
| 2011/0022980 | A1 | 1/2011 | Segal et al. | |
| 2012/0285089 | A1 | 11/2012 | Artwohl et al. | |
| 2013/0005443 | A1 | 1/2013 | Kosta et al. | |
| 2013/0265525 | A1 | 10/2013 | Dunn et al. | |
| 2014/0110223 | A1 * | 4/2014 | Coen | ..................... B65G 37/00 |
| | | | | 198/602 |
| 2015/0073590 | A1 | 3/2015 | Garcia Manchado et al. | |
| 2017/0225602 | A1 * | 8/2017 | Corrigan | ................... B60P 1/44 |
| 2017/0291766 | A1 * | 10/2017 | Orth | ....................... G06Q 10/08 |
| 2017/0305669 | A1 * | 10/2017 | Tsai | ......................... B65G 1/10 |
| 2017/0357919 | A1 * | 12/2017 | Bischoff | ................. B60P 3/007 |

* cited by examiner

TABLE VENDING MACHINE

FIELD

The described embodiments generally relate to systems and methods for dispensing food and beverage products from a vending machine.

BACKGROUND

Vending machines are used to dispense food and beverage products to consumers in an automated fashion. A typical vending machine can contain a combination of beverages, such as soda, juice, or water, and food products, such as nuts, snack mix, and candy bars. Vending machines typically include advertising or branding on exterior surfaces that is designed to attract potential customers.

BRIEF SUMMARY

A table-top vending machine includes a lower housing and an upper housing located on top of the lower housing, wherein the upper housing includes a transparent portion that is configured to make an interior of the upper housing visible from the exterior of the table-top vending machine. A delivery portal is located on the upper housing and is configured to allow a customer to access a product without accessing the interior of the upper housing. A product delivery system is disposed in the upper housing. It includes a horizontally-oriented roller surface comprising a plurality of rollers, wherein each of the plurality of rollers is operatively connected to a roller actuator that is configured to spin the roller and a roller tray moveably disposed on the roller surface, wherein the plurality of rollers allows the roller tray to move in a horizontal plane. The roller tray is configured to releasably retain the product. A product storage system is located in the lower housing and is configured to releasably store the product. A product transportation system is disposed in the lower housing and is configured to transport the product from the product storage system to the roller tray. A user interface is located on the upper housing and is configured to enable a customer to purchase the product. The product delivery system is visible from the exterior of the vending machine through the transparent portion.

Other embodiments of a system for vending products include a product storage system configured to releasably store the products disposed in a lower housing and a product transportation system located in the lower housing configured to transport the product from the lower housing to an upper housing. A product delivery system is located in the upper housing and is configured to deliver the product to a delivery portal disposed on the upper housing. The product delivery system includes a horizontally-oriented roller surface and a moveable roller tray that is configured to releasably retain the product. The roller surface also includes a plurality of rollers that are connected to roller actuators configured to spin the rollers, wherein the spinning of the rollers enables the roller tray to translate along the roller surface.

A method for using embodiments of the vending machine includes receiving a product selection input from a customer at a user interface disposed on an upper housing of the vending machine. Then, the vending machine transports an example of the selected product from a product storage system disposed in a lower housing of the vending machine to the upper housing using a product transportation system disposed in the lower housing. Next, the vending machine receives the selected product at a roller tray disposed on a horizontally oriented roller surface disposed in the upper housing, wherein the roller tray is configured to releasably retain the product. Then, the vending machine transports the product to a delivery portal disposed on the upper housing by actuating a plurality of rollers disposed on the roller surface using a plurality of roller tray actuator. Finally, the vending machine dispenses the product to the customer through the delivery portal.

BRIEF DESCRIPTION OF THE FIGURES

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

Vending machines are devices designed to automatically dispense products, including consumable products, such as soda or candy bars, to a consumer without the need for a salesperson to be present. These machines are configured to securely store the food products and dispense a selected product once payment for the product has been processed. A typical vending machine has a large, rectangular housing that stores the food products and contains the necessary input and payment systems. Because of their size and form factor, vending machines are usually installed against a wall or in a recess in a wall. This limitation is undesirable because it restricts the ability to place vending machines in areas frequented by potential customers.

Vending machines include various elements designed to attract potential customers and interact with them. For example, most vending machines include exterior branding that represents some of the products available for vending. Many modern vending machines also include transparent sections that allow customers to view the products directly from the exterior of the vending machine. Customers are able to see the products, which often have their own branding, as well as the operation of the internal delivery and vending mechanism. These elements are able to attract and interact with customers to an extent, but improvements in customer attraction and interaction are necessary to increase vending machine sales.

In embodiments, a vending machine includes a housing having a horizontal planar top surface and defining a product compartment disposed below the top surface and a plurality of products for vending disposed in the product compartment. At least a portion of the top surface is transparent and one or more of the products are visible through the transparent top surface.

An embodiment of the present disclosure is a table-top vending machine comprising a lower housing and an upper housing disposed on top of the lower housing, wherein the upper housing comprises a transparent portion that is configured to make an interior of the upper housing visible from the exterior of the table-top vending machine. A delivery portal is disposed on the upper housing configured to allow a customer to access a product without accessing the interior of the upper housing. A product delivery system is disposed in the upper housing, wherein the product delivery system comprises a horizontally-oriented roller surface comprising a plurality of rollers, wherein each of the plurality of rollers is operatively connected to a roller actuator that is configured to spin the roller and a roller tray moveably disposed on the roller surface, wherein the plurality of rollers allows the roller tray to move in a horizontal plane and wherein the roller tray is configured to releasably retain the product. A product storage system disposed in the lower housing is configured to releasably store the product and a product transportation system disposed in the lower housing is configured to transport the product from the product storage system to the roller tray. A user interface disposed on the upper housing is configured to enable a customer to purchase the product. The product delivery system is visible from the exterior of the vending machine through the top wall.

Figure 5:
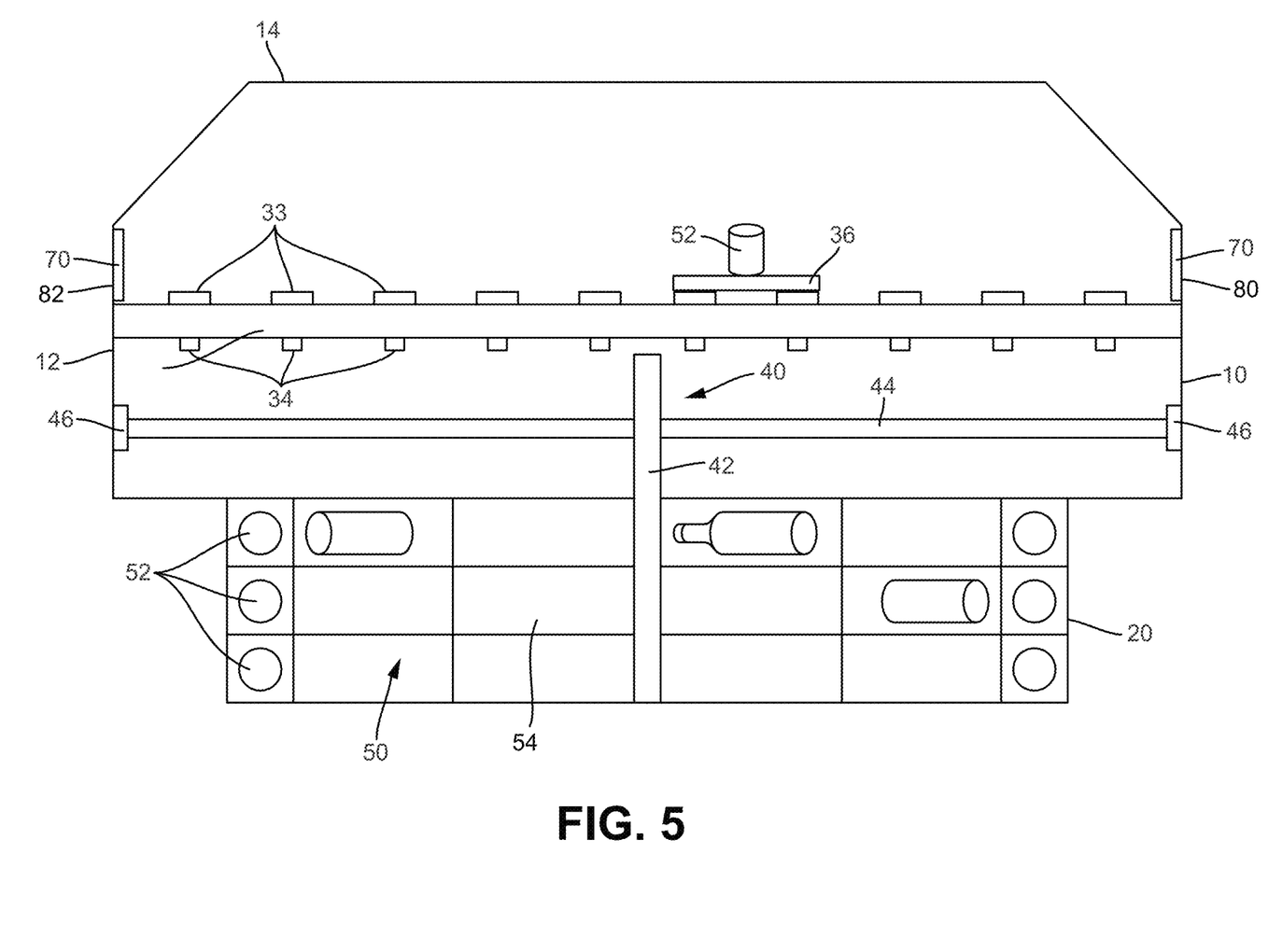
FIG. 5 is a cross section view of a vending machine according to embodiments.

Embodiments described herein may have one or more advantages over existing vending machines. For example, as can be seen in FIG. 5, it may be placed in shared spaces, such as in a waiting room or in the middle of a cafeteria. This enables the vending machine to be integrated into spaces that cannot host a traditional vending machine. Another exemplary advantage is the manner in which the transparent top portion combined with a roller-based product delivery system serves to attract customers. Traditional vending machines cannot match the visual effect created by the roller-based delivery system visible through the transparent top portion.

Figure 1:
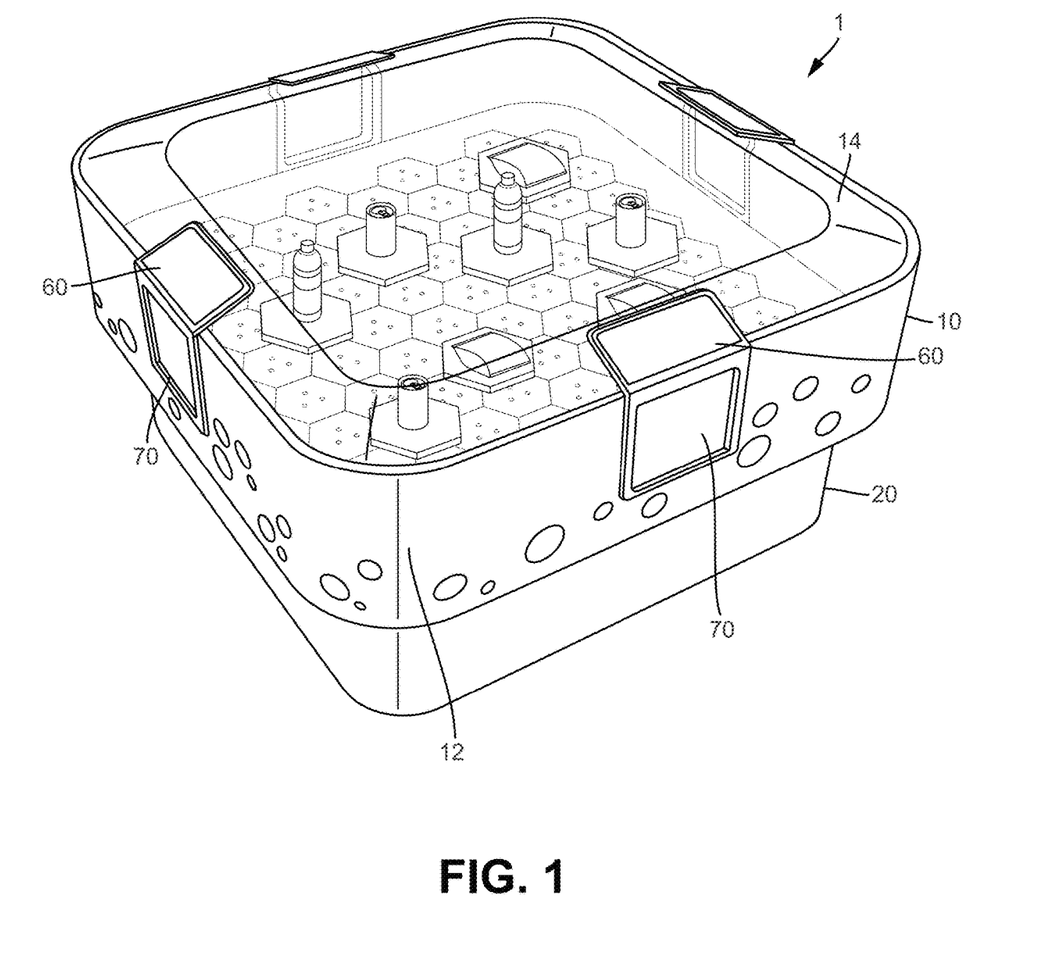
FIG. 1 is a isometric view of a vending machine according to embodiments.

In embodiments, as best shown in FIG. 1, a vending machine 1 includes an upper housing 10 placed on top of a lower housing 20. In some embodiments, upper housing 10 and lower housing 20 are generally rectangular. In other embodiments, upper housing 10 and lower housing 20 are generally square, with upper housing 10 possessing longer sides than lower housing 20. Lower housing 20 includes a lower housing wall 22 that is made of a suitable, non-transparent material such as, for example, metals, plastics, or composite materials. In some embodiments, upper housing 10 and lower housing 20 may be of unitary construction, which is to say they are one continuous structure.

Figure 2:
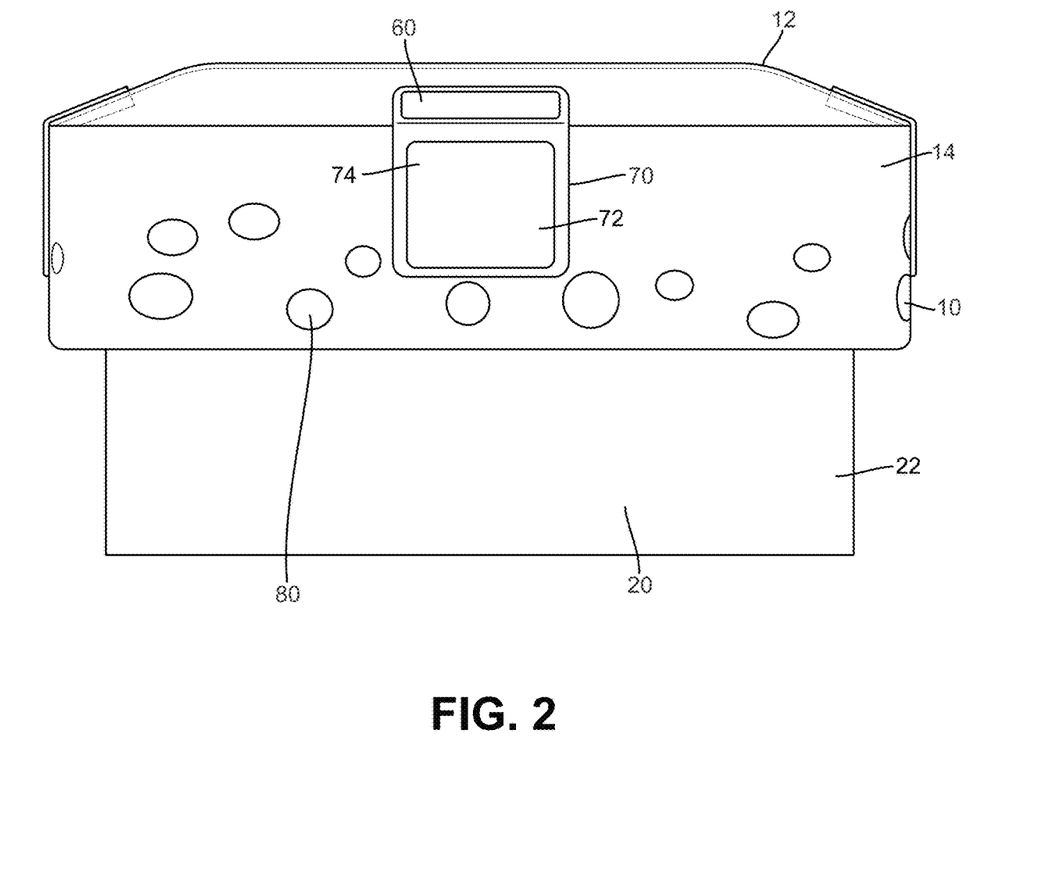
FIG. 2 is a side view of a vending machine according to embodiments.

As shown in FIGS. 1-2, upper housing 10 comprises an upper housing wall 12 and a top surface 14 located above upper housing wall 12. Top surface 14 may be made of an appropriate transparent material and therefore may be configured to make part of the interior of vending machine 1 visible from the exterior of vending machine 1. In some embodiments, top surface 14 may be a horizontal, planar surface. In some embodiments, top surface 14 may be parallel to a surface, such as a floor, that is supporting vending machine 1. Upper housing wall 12 may be made from an appropriate, non-transparent material, such as, for example, metals, plastics, or composite materials.

In embodiments, vending machine 1 may be configured to have a smaller form factor than that of traditional vending machines. For example, some embodiments of vending machine 1 may be no more than four feet in height and five feet in a maximum length or width dimension. These measurements may be varied to adapt vending machine 1 to a particular space, and so, for example, other embodiments of vending machine 1 may measure no more than three feet in height and four feet in a maximum length or width dimension. Some embodiments of vending machine 1 may be adapted to function as furniture, for example, as a table, by adjusting the total height of vending machine 1 and the amount by which upper housing 10 is wider than lower housing 20. In some embodiments, the ratio of height to width of vending machine 1 may be less than one, which is to say vending machine 1 is wider than it is tall. In some embodiments, the ratio of height to width of vending machine 1 may be less than 0.5. In some environments, the lower height of vending machine 1 enables it to be placed in locations that would otherwise be inaccessible to traditional, large vending machines.

Figure 3:
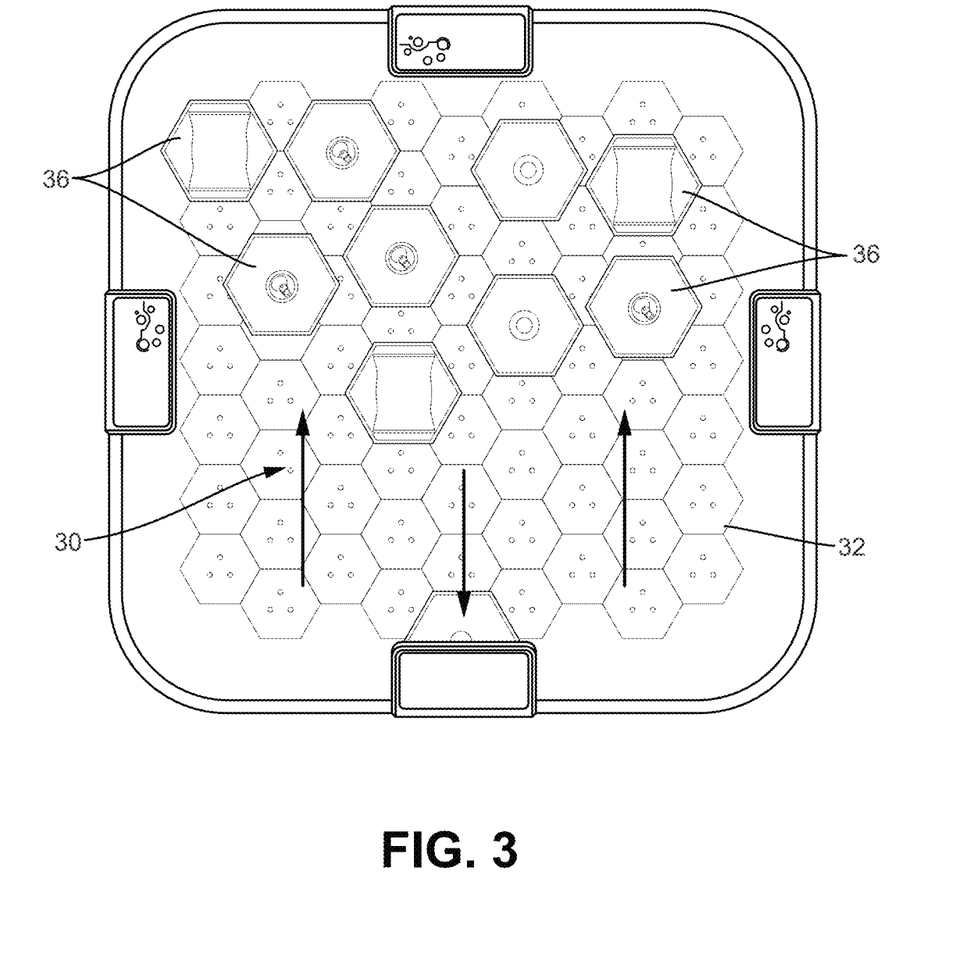
FIG. 3 is a top view of a vending machine according to embodiments.
Figure 4:
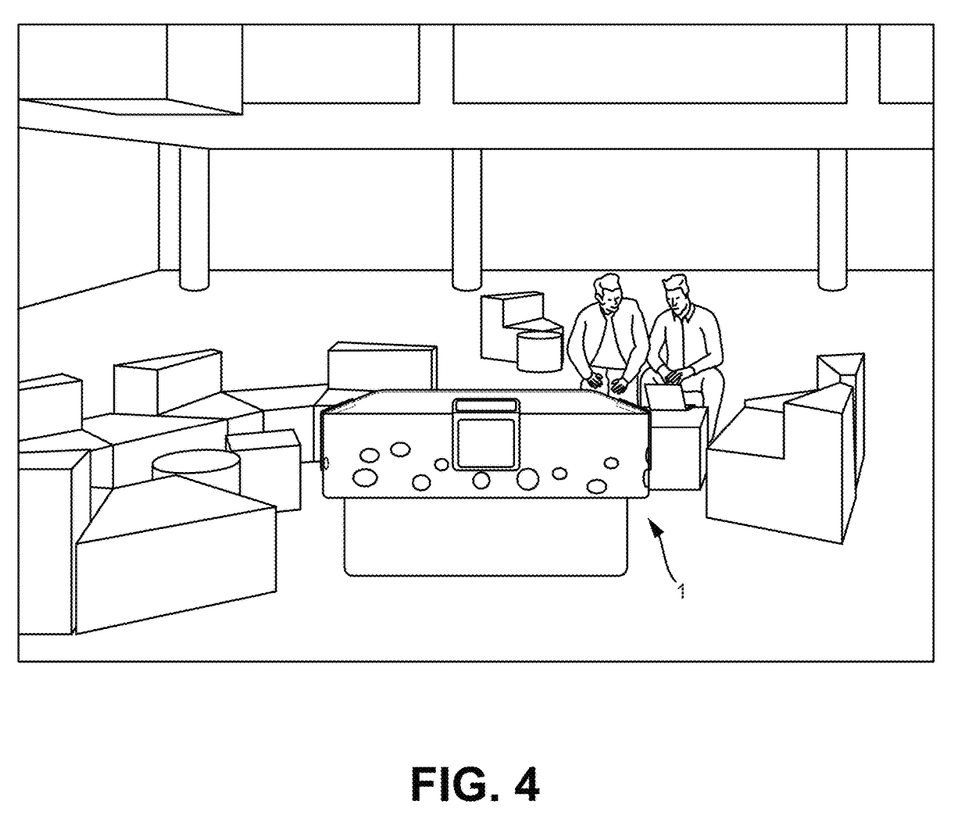
FIG. 4 is a view of a vending machine in a retail environment according to embodiments.

In embodiments, vending machine 1 may include a product delivery system 30. Product delivery system 30 is disposed in upper housing 10. As best shown in FIGS. 1 and 3, product delivery system 30 comprises a horizontally-oriented roller surface 32. Roller surface 32 comprises a plurality of rollers 33 that are configured to protrude slightly above roller surface 32. Rollers 33 are free to rotate. This allows flat objects placed on top of roller surface 32 to displace freely around roller surface 32 with minimal force needed because rollers 33 support the weight of the object.

In some embodiments, rollers 33 are connected to roller actuators 34. Roller actuators 34 can spin rollers 33 in either direction. Thus, objects that are resting on top of rollers 33 can be moved across roller surface 32 by using roller actuators 34 to spin rollers 33. In one embodiment, a roller surface 32 with actuated rollers 33 may be provided as described in PCT Publication WO/2014/012861, the disclosure of which is incorporated herein in its entirety by reference thereto. The actuated roller surface 32 is able to transport objects on rollers 33 to any part of the surface by controlling which way rollers 33 spin.

In embodiments, vending machine 1 includes a roller tray 36. Roller tray 36 is also part of product delivery system 30. Roller tray 36 is configured with a flat bottom surface designed to slide along roller surface 32. The top surface of roller tray 36 is configured to releasably retain a product 52 for vending. In some embodiments, roller tray 36 may include a flat surface wherein product 52 simply rests against the flat surface. In other embodiments, roller tray 36 may include a mechanism to retain product 52, such as an actuated lever or gripping device. As best shown in FIGS. 3 and 5, roller tray 36 can translate along roller surface 32 through the actuation of rollers 33 and reach any part of roller surface 32, which in some embodiments extends through substantially all of a horizontal plane of upper housing 10. In some embodiments of vending machine 1, roller surface 32, rollers 33, and roller tray 36 is visible from the exterior of vending machine 1 through transparent portion of upper housing wall 12 of upper housing 10. Some embodiments of vending machine 1 may include more than one roller tray 36. In these embodiments, roller trays 36 may be moved at the same time as each other in order to, for example, deliver products 52 to separate delivery portals 60 simultaneously. Embodiments of vending machine 1 where roller surface 32 is visible from the exterior may be programmed to move roller tray 36 in patterns designed to attract customers to vending machine 1. For example, a plurality of roller trays 36 may be moved in fast-moving, complex patterns along roller surface 32 by rollers 33 in order to attract potential customers to vending machine 1.

In embodiments, vending machine 1 includes a product storage system 50. Product storage system 50 is disposed in lower housing 20. Products 52 are releasably stored in product storage system 50. In some embodiments, product storage system 50 includes a plurality of product storage cartridges 54, which are configured to releasably store products 52. Typically, one type of product is stored in each product storage cartridge 54, which are in turn releasably disposed in lower housing 20 as part of product storage system 50. Product storage cartridges 54 may be preloaded with products 52, which improves efficiency of resupplying vending machine 1 by reducing the number of items that must be removed and replaced from vending machine 1.

In embodiments, vending machine 1 may include a product transportation system 40. Product transportation system 40 is disposed in lower housing 20 and upper housing 10. Product transportation system 40 is configured to transport products 52 from product storage system 50 in lower housing 20 to roller tray 36 located on roller surface 32. Product transportation system 40 may be any well-known system for transporting products in vending machines. For example, in some embodiments, product transportation system 40 combines an x-y delivery system oriented in a horizontal plane with a product elevator 42. Product elevator 42 is configured to releasably retain product 52 that is retrieved from product storage system 50. Products 52 may be transferred from product storage system 50 to product elevator 42 in several different ways. For example, products 52 may be fed onto product elevator 42 by the force of gravity. In some embodiments, products 52 may be loaded into coils of rigid wire formed in a corkscrew shape, wherein the corkscrew may be advanced a certain number of degrees to transfer product 52 to product elevator 42. Other suitable methods for transferring product 52 from product storage system 50 to product elevator 42 are well-known in the art.

The x-y system transports product elevator 42 in a horizontal plane that is located below roller surface 32, and product elevator 42 may lower to retrieve product 52 from product storage system 50 and then may raise to deposit product 52 onto roller tray 36 once it is in the proper horizontal position. In embodiments, roller surface 32 may have an opening that allow product elevator 42 to access roller tray 36. The x-y delivery system may consist of a first track 44 that is fixed in upper housing 10 or lower housing 20 such that it is oriented to be parallel to one of the sides of vending machine 1. Second track 46 is moveably attached to first track 44 such that it is perpendicular to the first track 44. Product elevator 42 can be moveably attached to second track 46. Actuation enables second track 46 to move along first track 44 and product elevator 42 to move along second track 46. Examples of actuation may include a gear and rack mechanism or a belt or chain drive disposed on each of first track 44 and second track 46. Other systems for transporting products 52 from lower housing 20 may be employed without limitation.

In embodiments, vending machine 1 includes one or more delivery portals 60. One or more delivery portals 60 are disposed on the exterior of vending machine 1. In some embodiments, delivery portals 60 are disposed on the exterior of upper housing 10. In some embodiments, delivery portals 60 may be disposed on top surface 14 of vending machine 1. In some embodiments, delivery portals 60 may be disposed on surfaces of vending machine 1 that are perpendicular to top surface 14. Delivery portals 60 are configured to allow a customer to access an interior portion of vending machine 1 to retrieve product 52 without gaining access to the remainder of vending machine 1. In some embodiments, one delivery portal 60 is installed on each of the sides of vending machine 1. This enables multiple customers to retrieve products 52 that they have ordered simultaneously.

In embodiments, vending machine 1 includes a delivery interface 70. Delivery interface 70 is disposed on the exterior of vending machine 1. Delivery interface 70 is configured to receive input from a customer, relay information to a customer regarding products 52 available for vending, and accept payment information from the customer. In some embodiments, delivery interface 70 comprises a input device 72, such as a keypad or touchscreen. Delivery interface 70 also includes a display device 74 configured to display information to the customer. In some embodiments, delivery interface 70 and display device 74 may be combined into one device, such as the case when a touchscreen is used. More than one delivery interface 70 may be disposed on the exterior of vending machine 1. For example, each delivery interface 70 may be paired with, and disposed nearby, each delivery portal 60.

In embodiments, vending machine 1 includes a controller 80 and sensors 82. Sensors 82 are designed to sense the proximity of potential customers and transmit that information to controller 80. Sensors 82 may include exterior cameras, ultrasonic sensors, or any other type of sensors appropriate for this application. In embodiments of vending machine 1 with transparent top surface 14, controller 80 is configured to move the one or more roller trays 36 in a pattern along the roller surface 32 when potential customers are near vending machine 1. This pattern of movement is designed to entice potential customers to approach vending machine 1 and ultimately to make a purchase from vending machine 1. In embodiments of vending machine 1, controller 80 and sensors 82 may integrated into deliver interface 70.

Figure 6:
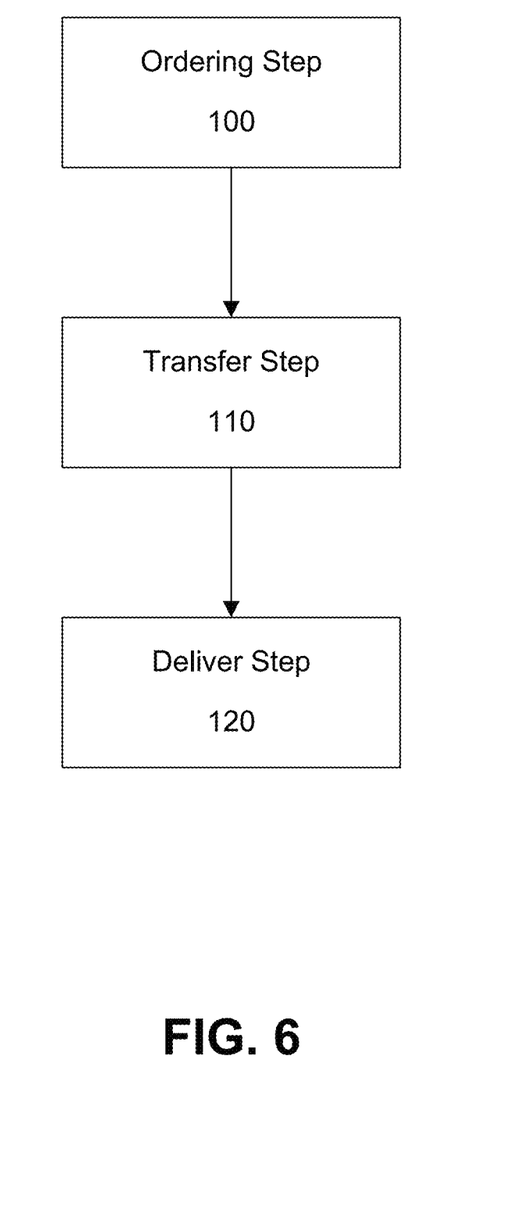
FIG. 6 is a block diagram of a method of using a vending machine according to embodiments.

A method of using embodiments of vending machine 1 is described here. As shown in Fig. First, in an ordering step 100, a customer receives information about available products 52 and places an order for one of products 52 using delivery portal 60. In a transfer step 110, product transportation system 40 retrieves product 52 from product storage system 50 and transfers it, using product elevator 42, to roller tray 36 on roller surface 32. In a second delivery step 120, roller tray 36 translates across roller surface 32 with the help or rollers 33 until it reaches delivery portal 60. In a retrieval step 130, product 52 is presented for retrieval by the customer in delivery portal 60.

A method of using embodiment of vending machine 1 to purchase a product begins when a customer approaches vending machine 1. The customer uses delivery interface 70 to review available products 52 and information related to those products. The customer then selects one of products 52 for purchase. Vending machine 1 transports product 52 from product storage system 50 to roller tray 36 on roller surface 32 using product elevator 42. Roller tray 36, which is configured to releasably retain product 52, is displaced across roller surface 32 on rollers 33 until it reaches delivery portal 60. The customer then retrieves product 52 through delivery portal 60.

The breadth and scope of the present disclosure should not be limited by any of the above-described exemplary embodiments, but should be defined only in accordance with the following claims and their equivalents.

What is claimed is:

1. A table-top vending machine, comprising:
   a lower housing;
   an upper housing disposed on top of the lower housing, wherein the upper housing comprises a transparent portion that is configured to make an interior of the upper housing visible from an exterior of the table-top vending machine;
   a delivery portal disposed on the upper housing configured to allow a customer to access a product without accessing the interior of the upper housing;
   a product delivery system disposed in the upper housing, comprising:
      a horizontally-oriented roller surface comprising a plurality of rollers, wherein each of the plurality of rollers is operatively connected to a roller actuator that is configured to spin the roller; and
      a roller tray moveably disposed on the roller surface, wherein the plurality of rollers allows the roller tray to move in a horizontal plane and wherein the roller tray is configured to releasably retain the product;
   a product storage system disposed in the lower housing configured to releasably store the product;
   a product transportation system disposed in the lower housing configured to transport the product from the product storage system to the roller tray; and
   a user interface disposed on the upper housing configured to enable a customer to purchase the product, wherein the product delivery system is visible from the exterior of the vending machine through the transparent portion.

2. The vending machine of claim 1, further comprising four delivery portals, wherein the upper housing is rectangular in shape, and each of the four delivery portals is disposed on a different vertical side of the upper housing.

3. The vending machine of claim 1, further comprising a plurality of delivery trays.

4. The vending machine of claim 1, further comprising:
   a controller disposed in the vending machine; and
   sensors disposed in the vending machine and operatively connected to the controller, wherein the controller is configured to sense the proximity of potential customers and is further configured to move the roller trays in response to sensing potential customers in proximity to the vending machine.

5. The vending machine of claim 1, wherein the total height of the vending machine is less than three feet.

6. A system for vending products, comprising:
   a product storage system configured to releasably store the products disposed in a lower housing;
   a product transportation system disposed in the lower housing configured to transport the product from the lower housing to an upper housing;
   a product delivery system disposed in the upper housing configured to deliver the product to a delivery portal disposed on the upper housing, wherein the product delivery system comprises a horizontally oriented roller surface and a moveable roller tray that is configured to releasably retain the product, and
   wherein the roller surface further comprises a plurality of rollers, each of the plurality of rollers being connected to a roller actuator configured to spin the roller, wherein the spinning of the rollers enables the roller tray to translate along the roller surface.

7. The system of claim 6, further comprising a transparent portion disposed on the upper housing, wherein the transparent portion is configured to allow an interior of the upper housing to be visible from the exterior of the upper housing.

8. The vending machine of claim 6, further comprising four delivery portals, wherein the upper housing is rectangular in shape, and each of the four delivery portals is disposed on a different vertical side of the upper housing.

9. A method for dispensing products from a vending machine, comprising:
   receiving a product selection input from a customer at a user interface disposed on an upper housing of the vending machine;
   transporting an example of the selected product from a product storage system disposed in a lower housing of the vending machine to the upper housing using a product transportation system disposed in the lower housing;
   receiving the selected product at a roller tray disposed on a horizontally oriented roller surface disposed in the upper housing, wherein the roller tray is configured to releasably retain the product;
   transporting the product to a delivery portal disposed on the upper housing by actuating a plurality of rollers disposed on the roller surface using a plurality of roller tray actuator;
   dispensing the product to the customer through the delivery portal.

10. The method of claim 9, further comprising:
    receiving a second product selection from a customer;
    receiving an example of the second selected product at a second roller tray disposed on the horizontally oriented roller surface; and
    transporting, on the second roller tray, the second product to a second dispensing portal, wherein transporting the first selected product and the second selected product on the roller surface occurs at the same time.

11. The method of claim 9, further comprising:
    detecting, using sensors disposed in the upper or lower housing, a potential customer in proximity to the vending machine;
    moving, through a controller, the roller tray in a pattern designed to attract the potential customer.

* * * * *